United States Patent
Schenker et al.

(10) Patent No.: US 9,724,641 B2
(45) Date of Patent: Aug. 8, 2017

(54) REGENERATABLE ION EXCHANGE MATERIAL FOR REDUCING THE AMOUNT OF $CO_2$

(71) Applicant: Omya International AG, Oftringen (CH)

(72) Inventors: Michel Schenker, Olten (CH); Patrick A. C. Gane, Rothrist (CH); Joachim Schoelkopf, Killwangen (CH); Daniel Gantenbein, Elnesvagen (NO)

(73) Assignee: Omya International AG, Oftringen (CH)

( * ) Notice: Subject to any disclaimer, the term of this patent is extended or adjusted under 35 U.S.C. 154(b) by 186 days.

(21) Appl. No.: 14/414,797

(22) PCT Filed: Jul. 16, 2013

(86) PCT No.: PCT/EP2013/064991
§ 371 (c)(1),
(2) Date: Jan. 14, 2015

(87) PCT Pub. No.: WO2014/023530
PCT Pub. Date: Feb. 13, 2014

(65) Prior Publication Data
US 2015/0165372 A1   Jun. 18, 2015

Related U.S. Application Data

(60) Provisional application No. 61/683,238, filed on Aug. 15, 2012.

(30) Foreign Application Priority Data

Aug. 8, 2012 (EP) .................................... 12179675

(51) Int. Cl.
| | |
|---|---|
| *B01D 53/02* | (2006.01) |
| *B01D 53/62* | (2006.01) |
| *B01J 20/12* | (2006.01) |
| *C01F 5/24* | (2006.01) |
| *C01F 11/18* | (2006.01) |
| *B01D 53/82* | (2006.01) |
| *B01D 53/96* | (2006.01) |
| *B01D 53/85* | (2006.01) |
| *B01J 39/02* | (2006.01) |
| *B01J 39/14* | (2006.01) |

(52) U.S. Cl.
CPC ............. *B01D 53/62* (2013.01); *B01D 53/02* (2013.01); *B01D 53/82* (2013.01); *B01D 53/85* (2013.01); *B01D 53/96* (2013.01); *B01J 20/12* (2013.01); *B01J 39/02* (2013.01); *B01J 39/14* (2013.01); *C01F 5/24* (2013.01); *C01F 11/18* (2013.01); *B01D 2251/402* (2013.01); *B01D 2251/404* (2013.01); *B01D 2251/406* (2013.01); *B01D 2252/10* (2013.01); *B01D 2253/108* (2013.01); *B01D 2253/11* (2013.01); *B01D 2253/206* (2013.01); *B01D 2255/804* (2013.01); *B01D 2257/504* (2013.01); *Y02C 10/04* (2013.01); *Y02C 10/06* (2013.01); *Y02C 10/08* (2013.01); *Y02P 20/152* (2015.11)

(58) Field of Classification Search
CPC ........ B01D 2251/402; B01D 2251/404; B01D 2251/406; B01D 2252/10; B01D 2253/108; B01D 2253/11; B01D 2253/206; B01D 2255/804; B01D 2257/504; B01D 53/02; B01D 53/62; B01D 53/82; B01D 53/85; B01D 53/96; B01J 20/12; B01J 39/02; B01J 39/14; C01F 11/18; C01F 5/24; Y02C 10/04; Y02C 10/06; Y02C 10/08; Y02P 20/152
See application file for complete search history.

(56) References Cited

U.S. PATENT DOCUMENTS

| | | | | |
|---|---|---|---|---|
| 3,466,138 A | * | 9/1969 | Routsis | ............... H01M 8/0662 423/230 |
| 6,279,576 B1 | * | 8/2001 | Lambert | ............... A61M 16/22 128/204.18 |
| 7,314,847 B1 | | 1/2008 | Siriwardane | |
| 7,374,694 B2 | | 5/2008 | Gaudinot et al. | |
| 8,691,176 B2 | * | 4/2014 | Kang | ................... B01J 19/2465 252/184 |
| 2004/0213705 A1 | | 10/2004 | Blencoe et al. | |
| 2004/0219090 A1 | | 11/2004 | Dziedzic et al. | |
| 2008/0289495 A1 | | 11/2008 | Eisenberger et al. | |
| 2008/0296146 A1 | | 12/2008 | Toulhoat et al. | |

(Continued)

FOREIGN PATENT DOCUMENTS

| | | |
|---|---|---|
| CN | 102120588 A | 7/2011 |
| EP | 0520826 A1 | 12/1992 |

(Continued)

OTHER PUBLICATIONS

Sipila et al. "Carbon dioxide sequestration by minteral carbonation." Jan. 1, 2008, Report VT, Abo Adademis Tryckekri, pp. 1-59.
The International Search Report, dated May 9, 2013 for PCT Application No. PCT/EP2013/064991.
The Written Opinion of the International Searching Authority, dated May 9, 2013 for PCT Application No. PCT/EP2013/064991.
European Search Report dated Feb. 13, 2013 for EP 12179675.9.
English Translation of Decision on Grant dated Mar. 12, 2014 for Application No. RU 2015108045.
Examination Report dated Oct. 19, 2016 for Application No. AU 2013301743.
English Translation of Office Action dated Oct. 19, 2015 for Application No. SG 1201500817V.

(Continued)

*Primary Examiner* — Christopher P Jones
(74) *Attorney, Agent, or Firm* — Amster, Rothstein & Ebenstein LLP

(57) ABSTRACT

The present invention relates to a method for reducing the amount of $CO_2$ in a carbon dioxide-containing source by using a regeneratable ion exchange material.

43 Claims, 2 Drawing Sheets

(56) References Cited

U.S. PATENT DOCUMENTS

Figure 1:
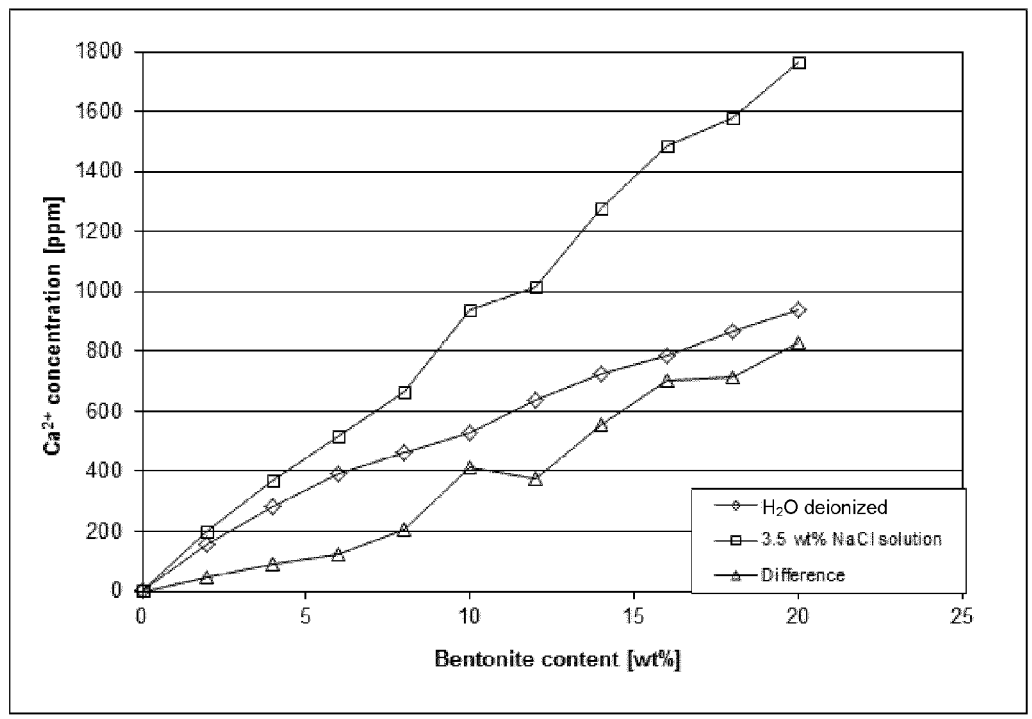

| | | | | |
|---|---|---|---|---|
| 2009/0214408 A1* | 8/2009 | Blake | ............... | B01D 53/62 |
| | | | | 423/232 |
| 2010/0205856 A1* | 8/2010 | Kubic | ............... | B01D 53/62 |
| | | | | 44/451 |
| 2010/0258506 A1 | 10/2010 | Berkowitz et al. | | |
| 2011/0041688 A1 | 2/2011 | Eisenberger | | |
| 2011/0088550 A1 | 4/2011 | Tirio | | |
| 2011/0091955 A1 | 4/2011 | Constantz et al. | | |
| 2012/0230875 A1* | 9/2012 | Ogawa | ............... | B01D 53/1425 |
| | | | | 422/110 |
| 2012/0240764 A1* | 9/2012 | Kim | ............... | B01D 53/1425 |
| | | | | 95/65 |
| 2012/0241378 A1* | 9/2012 | Riviello | ............... | G01N 30/96 |
| | | | | 210/656 |
| 2013/0323143 A1* | 12/2013 | Olfi | ............... | B01D 53/62 |
| | | | | 423/181 |

FOREIGN PATENT DOCUMENTS

| | | | |
|---|---|---|---|
| JP | 5840153 A | 3/1983 | |
| JP | 11216332 | 1/1998 | |
| JP | 1085791 A | 4/1998 | |
| JP | 2005074310 A | 3/2005 | |
| JP | 2005097072 A | 4/2005 | |
| JP | 2007515283 A | 6/2007 | |
| WO | 2007003013 A1 | 1/2007 | |
| WO | 2009146436 A1 | 3/2009 | |
| WO | 2010012691 A1 | 2/2010 | |
| WO | 2011049759 A1 | 4/2011 | |
| WO | 2011077117 A1 | 6/2011 | |

OTHER PUBLICATIONS

Office Action dated Mar. 4, 2016 for Application No. CA 2,879,243.
English Translation of Office Action dated Mar. 22, 2016 for Application No. JP 2015-525801.
English Translation of Examination Report dated Oct. 6, 2014 for Application No. TW 102125076.
Office Action dated Oct. 9, 2015 for Application No. CN201380041673.5.
English Translation of Office Action dated Jan. 13, 2016 for Application No. KR 10-2015-7002485.
"Carbon dioxide sequestration by mineral carbonation." XP007906702—Faculty of Technology—Heat Engineering Laboratory—Report 2008-1 (Literature review updated 2005-2007).
Thomson—XP002691481 dated Feb. 6, 2013.
Office Action dated Jan. 12, 2017 for GC 2013-25102.
Office Action dated Feb. 20, 2017 for CN 201380041673.5.

* cited by examiner

REGENERATABLE ION EXCHANGE MATERIAL FOR REDUCING THE AMOUNT OF CO$_2$

CROSS-REFERENCE TO RELATED APPLICATIONS

This application is a U.S. national phase of PCT Application No. PCT/EP2013/064991, filed Jul. 16, 2013, which claims priority to European Application No. 12179675.9, filed Aug. 8, 2012 and U.S. Provisional Application No. 61/683,238, filed Aug. 15, 2012.

The present invention relates to a method for reducing the amount of CO$_2$ in a carbon dioxide-containing source by using a regeneratable ion exchange material as well as the use of a regeneratable ion exchange material for reducing the amount of CO$_2$ from a carbon dioxide-containing source.

Evidence for changes of the climate system arises from observed increases in global average air and ocean temperatures. Furthermore, climate models indicate that during the 21$^{st}$ century, the global surface temperature may further rise up by about 6° C. In this estimation, the increase in greenhouse gas concentration is considered to play an important role. However, the greenhouse gases emitted to a large extent originate from human activities such as deforestation and the burning of fossil fuels (e.g. coal, gasoline, oil etc.), wherein carbon dioxide is the major gas emitted.

Accordingly, one of the main issues in this regard is the reduction of the present greenhouse gas concentration and especially of carbon dioxide and, furthermore, reducing or avoiding the emission of such gases to the atmosphere.

In the art, several approaches for reducing of the carbon dioxide concentration in the atmosphere and reducing or avoiding the emission of such gases to the atmosphere have been proposed. For instance, WO 2011/049759 describes a process for the reduction of carbon dioxide from various types of gas emitting sources containing carbon dioxide, including the reduction of carbon dioxide from industrial gas emitting sources via the use of an ion exchange material. US 2011/0091955A1 describes a method comprising (i) contacting a gaseous stream comprising CO$_2$ with a catalyst to form a solution comprising hydrated CO$_2$; and (ii) treating the solution to produce a composition comprising a metastable carbonate. The metastable carbonate is described as being more stable in salt water than in fresh water. The metastable carbonate may be selected from the group consisting of vaterite, aragonite, amorphous calcium carbonate, and combinations thereof.

Furthermore, US 2011/041688A1 describes that a sorbent structure is used in further structures and techniques to bind carbon dioxide in a carbon dioxide laden air stream, and process heat is used to separate carbon dioxide from the sorbent structure and regenerate the sorbent structure. US 2010/258506A1 describes a method of decreasing a CO$_2$ concentration of a fluid, the method comprising applying a flow of a first gas comprising trace amounts or no CO$_2$ to a fluid comprising: a second gas comprising CO$_2$ at a concentration of at least higher than that found in an air-water equilibrium; a salt; and a liquid; whereby solid carbonate is formed in said fluid and the concentration of said CO$_2$ in said fluid is decreased. US 2008/289495A1 describes a system for removing carbon dioxide from an atmosphere to reduce global warming including an air extraction system that collects carbon dioxide from the atmosphere through a medium and removes carbon dioxide from the medium; a sequestration system that isolates the removed carbon dioxide to a location for at least one of storage and which can increase availability of renewable energy or non-fuel products such as fertilizers and construction materials; and one or more energy sources that supply process heat to the air extraction system to remove the carbon dioxide from the medium and which can regenerate it for continued use.

US 2004/219090A1 describes a process for selectively removing carbon dioxide from a gaseous stream by converting the carbon dioxide to a solid, stable form. In a sequestration process, carbon dioxide enriched air is passed through a gas diffusion membrane to transfer the carbon dioxide to a fluid medium. The carbon dioxide rich fluid is then passed through a matrix containing a catalyst specific for carbon dioxide, which accelerates the conversion of the carbon dioxide to carbonic acid. In the final step, a mineral ion is added to the reaction so that a precipitate of carbonate salt is formed. U.S. Pat. No. 7,314,847 describes a method for producing sorbents to aid in the removal of carbon dioxide (CO$_2$) from the atmosphere or from other sources such as power plants.

However, the described methods for reducing the carbon dioxide concentration in the atmosphere and reducing or avoiding the emission of such gases to the atmosphere have the disadvantage that carbon dioxide is usually not chemically bound and, furthermore, that the used sorbent materials are consumed during the described methods.

Thus, there is a continuous need for improving methods for reducing the amount of CO$_2$ in a carbon dioxide-containing source which addresses the foregoing technical problems described and especially allows for reducing the carbon dioxide concentration while regenerating the used sorbent material.

Accordingly, it is an objective of the present invention to provide a method for reducing the amount of CO$_2$ in a carbon dioxide-containing source using a regeneratable sorbent material. A further objective is to provide a method for reducing the amount of CO$_2$ in a carbon dioxide-containing source such that the captured carbon dioxide is converted into a form that is stable over time. Even a further objective is to provide a method for reducing the amount of CO$_2$ in a carbon dioxide-containing source such that the stable form of the captured carbon dioxide can be easily isolated. A still further objective is to provide a method for reducing the amount of CO$_2$ in a carbon dioxide-containing source that can be carried out under cost-efficient conditions, i.e. by reducing the content of or avoiding the use of cost-intensive raw materials based on manmade resources. Further objectives can be gathered from the following description of the invention.

The foregoing and other objectives are solved by the subject-matter as defined herein in the present invention.

According to a first aspect of the present invention, a method for reducing the amount of CO$_2$ in a carbon dioxide-containing source by using a regeneratable ion exchange material is provided, wherein the method comprises the following steps of:

a) providing at least one ion exchange material comprising at least one earth alkali metal cation,
b) providing at least one carbon dioxide-containing source,
c) providing at least one source of at least one cation which is capable of replacing the at least one earth alkali metal cation of the at least one ion exchange material,
d) providing at least one source of at least one earth alkali metal cation, e) contacting the at least one ion exchange material of step a) with the at least one source of at least one cation of step c) such as to obtain a mixture comprising
   i) at least one ion exchange material, and
   ii) at least one earth alkali metal cation released from the at least one ion exchange material of step a),
f) separating the at least one earth alkali metal cation of step ii) from the at least one ion exchange material of step i),
g) contacting the at least one earth alkali metal cation obtained in step f) with the at least one carbon dioxide-containing source of step b) such as to obtain a carbonate salt of the at least one earth alkali metal cation, and
h) contacting the at least one ion exchange material obtained in step f) with the at least one source of at least one earth alkali metal cation of step d) such as to regenerate the at least one ion exchange material of step a).

The inventors surprisingly found that the foregoing method according to the present invention leads to a stable earth alkali metal carbonate product, i.e. can be easily isolated and avoids the use of cost-intensive raw materials based on manmade resources, by using a regeneratable sorbent material. More precisely, the inventors found that the concentration of carbon dioxide in a carbon dioxide-containing source can be reduced by converting the carbon dioxide into a defined carbonate salt by using a defined regeneratable ion exchange material.

It should be understood that for the purposes of the present invention, the following terms have the following meaning:

For the purpose of the present invention, the term "regeneratable" ion exchange material refers to a material that is recreated during a method cycle.

For the purpose of the present invention, the term "ion exchange material" refers to a material that is capable of exchanging earth alkali metal cations with cations being capable of replacing earth alkali metal cations and vice versa.

When in the following reference is made to preferred embodiments or technical details of the inventive method for reducing the amount of $CO_2$ in a carbon dioxide-containing source by using a regeneratable ion exchange material, it is to be understood that these preferred embodiments or technical details also refer to the inventive use as defined herein and vice versa (as far as applicable). If, for example, it is set out that the at least one ion exchange material of the inventive method is a natural and/or synthetic ion exchange material also the at least one ion exchange material of the inventive use is a natural and/or synthetic ion exchange material.

The present invention will be described with respect to particular embodiments and with reference to certain figures but the invention is not limited thereto but only by the claims. Terms as set forth hereinafter are generally to be understood in their common sense unless indicated otherwise.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to another aspect of the present invention, the use of a regeneratable ion exchange material for reducing the amount of $CO_2$ from a carbon dioxide-containing source is provided. It is preferred that the regeneratable ion exchange material comprises bentonite.

Advantageous embodiments of the present invention are defined in the corresponding sub-claims.

According to one embodiment of the present invention, the at least one ion exchange material of step a) is selected from a natural ion exchange material, a modified ion exchange material, a synthetic ion exchange material, and mixtures thereof.

According to another embodiment of the present invention, the at least one ion exchange material of step a) comprises a natural ion exchange material selected from the group comprising phyllosilicates, zeolite, mica, montmorillonite, mauritzite and mixtures thereof and/or a synthetic ion exchange material selected from the group comprising EDTA, ion exchange resins and mixtures thereof, preferably phyllosilicates.

According to yet another embodiment of the present invention, the at least one ion exchange material of step a) comprises at least one earth alkali metal cation selected from the group comprising magnesium, calcium, strontium and mixtures thereof, preferably calcium and/or magnesium.

According to one embodiment of the present invention, the at least one ion exchange material of step a) is provided in form of a solid or an aqueous suspension or an emulsion or a filter material or a fluidized bed.

According to another embodiment of the present invention, the at least one ion exchange material of step a) is provided in form of an aqueous suspension having an ion exchange material content of from 2 to 50 wt.-%, preferably from 5 to 40 wt.-%, more preferably from 7.5 to 30 wt.-% and most preferably from 10 to 20 wt.-%, based on the total weight of the aqueous suspension.

According to yet another embodiment of the present invention, the at least one ion exchange material of step a) consists of bentonite comprising various clay minerals selected from the group comprising montmorillonites and concomitant minerals such as quartz, mica, feldspar, pyrite, calcite, cristobalite and mixtures thereof.

According to one embodiment of the present invention, the at least one ion exchange material of step a) consists of bentonite having a montmorillonite content of at least 60 wt.-%, preferably of at least 80 wt.-%, e.g. between 85 and 95 wt.-%, based on the total weight of the bentonite.

According to another embodiment of the present invention, the ion exchange material of step a) consists of bentonite whose interlayer spaces are occupied primarily with calcium and/or magnesium ions.

According to yet another embodiment of the present invention, the at least one ion exchange material of step a) consists of bentonite having a weight median particle size $d_{50}$ from 0.02 to 100 μm, from 0.075 to 50 μm, or from 0.1 to 5 μm, preferably from 0.2 to 3.

According to yet another embodiment of the present invention, the at least one carbon dioxide-containing source of step b) is selected from a gas, liquid, solid, complex, ion exchange material and mixtures thereof, preferably a gas.

According to one embodiment of the present invention, the at least one carbon dioxide-containing source of step b) is selected from air, industrial exhaust gas streams, waste gas streams, volcanic outgassing and mixtures thereof.

According to another embodiment of the present invention, the at least one carbon dioxide-containing source of step b) comprises carbon dioxide providing a partial pressure of at least 0.02 Pa, preferably of at least 0.05 Pa, more preferably at least 0.1 Pa, even more preferably at least 0.15 Pa and most preferably at least 0.2 Pa.

According to yet another embodiment of the present invention, the at least one source of at least one cation of step c) and/or the at least one source of at least one earth alkali metal cation of step d) is an aqueous solution, preferably an aqueous solution comprising at least 50 wt.-%, more preferably at least 75 wt.-% and most preferably at least 90 wt.-%, based on the total weight of the aqueous solution, of water.

According to one embodiment of the present invention, the at least one source of at least one cation of step c) is a naturally occurring source of at least one monovalent and/or divalent cation capable of replacing the at least one earth alkali metal cation of the at least one ion exchange material, preferably a naturally occurring source of at least one monovalent cation capable of replacing the at least one earth alkali metal cation of the at least one ion exchange material.

According to another embodiment of the present invention, the at least one source of at least one cation of step c) is sea water.

According to yet another embodiment of the present invention, the at least one carbon dioxide-containing source of step b) and/or the at least one source of at least one cation which is capable of replacing the at least one earth alkali metal cation of the at least one ion exchange material of step c) and/or the at least one source of at least one earth alkali metal cation are provided in form of an aqueous solution, preferably an aqueous solution having a pH of between 5 and 12, preferably between 6 and 11 and most preferably between 7 and 10.5.

According to one embodiment of the present invention, the at least one cation of the at least one source of at least one cation of step c) is selected from the group comprising lithium, sodium, potassium, magnesium, strontium and mixtures thereof, preferably sodium.

According to another embodiment of the present invention, the at least one source of at least one cation of step c) comprises the at least one cation in an amount of from 0.1 to 150 g/l, preferably of from 1 to 100 g/l, more preferably of from 5 to 75 g/l and most preferably of from 10 to 50 g/l.

According to yet another embodiment of the present invention, the at least one source of at least one earth alkali metal cation of step d) is a naturally occurring source of at least one earth alkali metal cation, e.g. fresh hard water.

According to one embodiment of the present invention, the at least one source of at least one earth alkali metal cation of step d) is fresh hard water having a hardness of from 5 to 130° dH, preferably from 10 to 60° dH, and most preferably from 14 to 50° dH.

According to another embodiment of the present invention, the at least one earth alkali metal cation of the at least one source of at least one earth alkali metal cation of step d) is selected from magnesium, calcium, strontium and mixtures thereof, preferably calcium.

According to yet another embodiment of the present invention, the at least one source of at least one earth alkali metal cation of step d) comprises the at least one earth alkali metal cation in an amount from 0.1 to 200 mg/l, preferably from 0.5 to 150 mg/l, more preferably from 1 to 100 mg/l, even more preferably from 5 to 75 mg/l and most preferably from 10 to 50 mg/l.

According to one embodiment of the present invention, contacting step g) is carried out in that the at least one carbon dioxide-containing source of step b) is introduced into an aqueous solution obtained in step f). It is preferred that the aqueous solution obtained in step f) is further contacted with at least one catalyst for enhancing the hydratisation of carbon dioxide. It is further preferred that the at least one catalyst for enhancing the hydratisation of carbon dioxide is at least one enzyme, preferably carbonic anhydrase.

According to another embodiment of the present invention, contacting step e) and/or separating step f) and/or contacting step g) and/or contacting step h) is/are carried out at a temperature from 2° C. to 80° C., preferably from 4° C. to 60° C. and most preferably from 5° C. to 40° C.

According to yet another embodiment of the present invention, contacting step e) and/or separating step f) and/or contacting step g) and/or contacting step h) is/are carried out at a pH of between 4 and 12, preferably between 5 and 11 and most preferably between 7 and 10.5.

According to one embodiment of the present invention, contacting step g) is carried out under pressure of at least 100 Pa, more preferably at least 200 Pa and most preferably at least 300 Pa.

According to another embodiment of the present invention, contacting step h) is carried out before and/or during and/or after contacting step g).

According to yet another embodiment of the present invention, separating step f) is carried out by filtration, centrifugation, cycloning, sedimentation or a mixture thereof.

According to one embodiment of the present invention, the method further comprises step k) of separating the carbonate salt of the at least one earth alkali metal cation obtained in step g). It is preferred that separating step k) is carried out by filtration, centrifugation, cycloning, concentrating, evaporation, sedimentation or a mixture thereof.

In the following, it is referred to further details of the present invention and especially the foregoing steps of the method for reducing the amount of $CO_2$ in a carbon dioxide-containing source by using a regeneratable ion exchange material.

Step a): Providing at Least One Ion Exchange Material

According to step a) of the present invention, at least one ion exchange material comprising at least one earth alkali metal cation is provided.

The expression "at least one" ion exchange material means that one or more kinds of ion exchange materials may be utilised in the present method.

According to one embodiment of the present invention, only one kind of ion exchange material is utilised in the present method. According to another embodiment of the present invention, a mixture of at least two kinds of ion exchange materials is utilised in the present method.

According to one embodiment of the present invention, the at least one ion exchange material is selected from a natural ion exchange material, a modified ion exchange material, a synthetic ion exchange material, and mixtures thereof.

The term "natural" ion exchange material in the meaning of the present invention refers to an ion exchange material of natural origin.

The term "modified" ion exchange material in the meaning of the present invention refers to a natural ion exchange material that has been chemically treated.

The term "synthetic" ion exchange material in the meaning of the present invention refers to an ion exchange material that is not of natural origin, but has been made artificially by chemical reaction.

For example, if the at least one ion exchange material comprises a natural ion exchange material, the at least one ion exchange material is preferably selected from the group comprising phyllosilicates, zeolite, mica, montmorillonite, mauritzite and mixtures thereof.

If the at least one ion exchange material comprises a synthetic ion exchange material, the at least one ion exchange material is preferably selected from the group comprising EDTA, ion exchange resins and mixtures thereof.

Examples of synthetic ion exchange materials that may be used in the process of the present invention are ion exchange materials of the COWEX™ MAC, Amberlite™, Ambersep™ or IMAC® series by the Dow Chemical Company, USA.

In one embodiment of the present invention, the at least one ion exchange material is at least one natural ion exchange material. For example, the at least one ion exchange material is one kind of natural ion exchange material. If the at least one ion exchange material is at least one natural ion exchange material, the at least one ion exchange material preferably comprises phyllosilicates. Alternatively, the at least one ion exchange material consists of phyllosilicates.

If the at least one ion exchange material comprises phyllosilicates, preferably consists of phyllosilicates, the phyllo silicates are preferably selected from bentonite. Accordingly, the at least one ion exchange material preferably comprises bentonite, more preferably consists of bentonite.

If the at least one ion exchange material comprises or consist of bentonite, the bentonite usually comprises, preferably consists of, various clay minerals such as in particular montmorillonite as the main component, but also quartz, kaolinite, mica, feldspar, pyrite, calcite and/or cristobalite. These minerals may be present in variable amounts, as well as other components, depending on the site of origin.

Bentonite with a montmorillonite content of at least 60 wt.-%, preferably of at least 80 wt.-%, e.g. between 85 and 95 wt.-%, based on the total weight of the bentonite, is especially suitable for the method according to the present invention.

One specific requirement of the present invention is that the at least one ion exchange material comprises at least one earth alkali metal cation.

The expression "at least one" earth alkali metal cation means that one or more kinds of earth alkali metal cations may be present in the at least one ion exchange material.

According to one embodiment of the present invention, only one kind of earth alkali metal cation is present in the at least one ion exchange material. According to another embodiment of the present invention, a mixture of at least two kinds of earth alkali metal cations is present in the at least one ion exchange material.

According to one embodiment of the present invention, a mixture of at least two kinds of earth alkali metal cations is present in the at least one ion exchange material.

Preferably, a mixture of two kinds of earth alkali metal cations is present in the at least one ion exchange material.

The expression "earth alkali metal cation" refers to a divalent cation of an earth alkali metal, i.e. an earth alkali metal cation having a valency of two.

Additionally or alternatively, the at least one earth alkali metal cation is selected from the group comprising magnesium, calcium, strontium and mixtures thereof. For example, the at least one earth alkali metal cation comprises calcium and/or magnesium. In one embodiment of the present invention, the at least one earth alkali metal cation comprises calcium.

If the at least one earth alkali metal cation comprises calcium and/or magnesium, the presence of further earth alkali metal cation is not excluded. For example, if the at least one earth alkali metal cation comprises calcium, the at least one ion exchange material may further comprise magnesium and/or strontium. In one embodiment of the present invention, the at least one earth alkali metal cation comprises calcium and magnesium.

In this regard, it should be noted that the presence of at least one earth alkali metal cation in the at least one ion exchange material does not exclude the presence of further monovalent and/or divalent and/or trivalent cations in the at least one ion exchange material, e.g. alkali metals such as sodium, potassium, lithium and mixtures thereof and/or divalent cations such as zinc, manganese, iron and mixtures thereof and/or trivalent cations such as iron, aluminium and mixtures thereof.

If the at least one ion exchange material comprises or consists of bentonite, the bentonite comprises at least one earth alkali metal cation. For example, the bentonite is selected such that the interlayer spaces of the bentonite are occupied almost exclusively with calcium and/or magnesium ions as the at least one earth alkali metal cation. In one embodiment of the present invention, the ion exchange material consists of bentonite whose interlayer spaces are occupied primarily with calcium ions as the at least one earth alkali metal cation.

However, the presence of the at least one earth alkali metal cation does not exclude that alkali metal cations or trivalent cations such as aluminium may further occupy the interlayer spaces of the bentonite.

The term "interlayer space" or "interlayer spaces" in the meaning of the present invention refers to the space between two negatively charged layers in the crystal lattice of the at least one ion exchange material which may be occupied with interlayer cations, e.g. the at least one earth alkali metal cation and, if present, further monovalent and/or divalent and/or trivalent cations.

It is appreciated that the at least one ion exchange material of the present invention has a cation exchange capacity of at least 60 cmol+/kg at a pH of 7, preferably of at least 70 cmol+/kg at a pH of 7 and most preferably of at least 80 cmol+/kg at a pH of 7. For example, the at least one ion exchange material of the present invention has a cation exchange capacity of from 60 to 130 cmol+/kg at a pH of 7 or from 70 to 120 cmol+/kg at a pH of 7.

In one embodiment of the present invention, the at least one ion exchange material comprises or consists of bentonite having a cation exchange capacity of at least 60 cmol+/kg at a pH of 7, preferably of at least 70 cmol+/kg at a pH of 7 and most preferably of at least 80 cmol+/kg at a pH of 7. For example, the at least one ion exchange material comprises or consists of bentonite having a cation exchange capacity of from 60 to 130 cmol+/kg at a pH of 7 or from 70 to 120 cmol+/kg at a pH of 7.

The term "cation exchange capacity" refers to the maximum quantity of total cations, of any class, that the at least one ion exchange material is capable of holding, at a specific pH value, and which is available for ion exchange.

If the at least one ion exchange material comprises or consists of bentonite, the bentonite preferably has a weight median particle size $d_{50}$ from 0.02 to 100 μm, from 0.075 to 50 μm, or from 0.1 to 5 μm, preferably from 0.2 to 3 μm as measured by Sedigraph 5120.

Throughout the present document, the "particle size" of a particulate material is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.4 and 2 μm, a Sedigraph 5120 device from the company Micromeritics, USA, can be used. For determining the weight median particle size $d_{50}$ value for particles having a $d_{50}$ value below 0.4, a Matersizer device from the company Malvern Instruments GmbH, Germany, can be used.

It is preferred that the at least one ion exchange material of step a) is provided in form of a solid or an aqueous suspension or an emulsion or a filter material or a fluidized bed. For example, the at least one ion exchange material of step a) is provided in form of an aqueous suspension.

An "aqueous suspension" or "aqueous slurry" in the meaning of the present invention comprises insoluble solids and water, and optionally further additives and usually contains large amounts of solids, and, thus, is more viscous and can be of higher density than the liquid from which it is formed. However, the term "aqueous suspension" or "aqueous slurry" does not exclude that the water comprises minor amounts of at least one water-miscible solvent.

For example, the at least one water-miscible solvent is preferably selected from methanol, ethanol, acetone, acetonitrile, tetrahydrofuran and mixtures thereof.

In one embodiment of the present invention, the aqueous suspension comprises water in an amount of at least 60 wt.-%, preferably at least 70 wt.-%, more preferably at least 80 wt.-%, even more preferably at least 90 wt.-% and most preferably at least 92 wt.-%, based on the total weight of the water phase of the aqueous suspension. For example, the aqueous suspension comprises water in an amount of between 90 and 100 wt.-%, preferably between 92 and 100 wt.-%, more preferably between 94 and 100 wt.-% and most preferably between 96 and 100 wt.-%, based on the total weight of the water phase of the aqueous suspension.

In one embodiment of the present invention, the aqueous suspension comprising the at least one ion exchange material is free of water-miscible solvents.

In one embodiment of the present invention, the at least one ion exchange material is provided in form of an aqueous suspension having an ion exchange material content of from 2 to 50 wt.-%, based on the total weight of the aqueous suspension. For example, the at least one ion exchange material of step a) is provided in form of an aqueous suspension having an ion exchange material content of from 5 to 40 wt.-%, more preferably from 7.5 to 30 wt.-% and most preferably from 10 to 20 wt.-%, based on the total weight of the aqueous suspension.

The content of the at least one ion exchange material is selected such that the viscosity of the aqueous suspension is between 10 and 5 000 mPas, preferably between 100 and 2 500 mPas, and especially between 150 and 1 000 mPas, measured with a Brookfield viscometer (as described in the examples). The optimal content depends on the occurrence, i.e., the chemical and mineralogical composition of the at least one ion exchange material and its swellability, which in turn influences the viscosity.

Step b): Providing at Least One Carbon Dioxide-Containing Source

According to step b) of the present invention, at least one carbon dioxide-containing source is provided.

The expression "at least one" carbon dioxide-containing source means that one or more sources containing carbon dioxide may be utilised in the present method.

According to one embodiment of the present invention, only one kind of carbon dioxide-containing source is utilized in the inventive method. According to another embodiment of the present invention, a mixture of at least two carbon dioxide-containing sources is utilized in the inventive method.

In one embodiment of the present invention, only one kind of carbon dioxide-containing source is utilized in the inventive method.

The expression "carbon dioxide-containing source" refers to any source capable of releasing carbon dioxide.

The at least one carbon dioxide-containing source includes any convenient carbon dioxide-containing source. In particular, the at least one carbon dioxide-containing source may be selected from a gas, liquid, solid, complex, ion exchange material and mixtures thereof.

According to one embodiment of the present invention, the at least one carbon dioxide-containing source is provided in gaseous form.

The gaseous carbon dioxide may be substantially pure carbon dioxide or the gaseous carbon dioxide comprises multiple components that include carbon dioxide and one or more additional gases and/or other substances such as particulate materials such as ash.

According to one embodiment of the present invention, the at least one carbon dioxide-containing source is selected from air, industrial exhaust gas streams, waste gas streams, volcanic outgassing and mixtures thereof.

For example, the at least one carbon dioxide-containing source is an exhaust gas stream such as produced by an industrial plant. The industrial plant may be selected from a great variety. For example, the at least one carbon dioxide-containing source is produced by an exhaust gas stream produced by an industrial plant selected from power plants, chemical and mechanical processing plants, refineries and other industrial plants that produce carbon dioxide as e.g. a by-product of fuel combustion or other processing steps.

Suitable waste gas streams are selected from waste gas streams produced by industrial plants combusting fossil fuels such as coal, oil, natural gas and fuel products such as tar sands, heavy oil, oil shale etc.

The at least one carbon dioxide-containing source may contain carbon dioxide as the primary component, or may contain additional components such as nitrogen oxides (NOx), sulfur oxides (SOx) and at least one additional gaseous and/or particulate components. Additional gaseous and/or particulate components may include carbon oxide, halides such as hydrogen chloride and hydrogen fluoride, metals such as mercury, arsenic, beryllium, boron, cadmium, chromium, cobalt, lead, manganese, molybdenum, selenium, strontium, thallium, vanadium etc., organics such as hydrocarbons, dioxins, and PAH compounds (polycyclic aromatic hydrocarbons) and/or dust particles such as typically obtained in combustion processes.

In one embodiment of the present invention, the at least one carbon dioxide-containing source comprises carbon dioxide providing a partial pressure of at least 0.02 Pa, preferably of at least 0.05 Pa, more preferably at least 0.1 Pa, even more preferably at least 0.15 Pa and most preferably at least 0.2 Pa.

Additionally or alternatively, the at least one carbon dioxide-containing source comprises carbon dioxide in an amount of at least 2 vol.-%, preferably of at least 5 vol.-%, more preferably of at least 10 vol.-%, even more preferably of at least 15 vol.-% and most preferably of at least 20 vol.-%, based on the total volume of the at least one carbon dioxide-containing source.

In one embodiment of the present invention, the at least one carbon dioxide-containing source is introduced into water to form an aqueous solution. An "aqueous solution" in the meaning of the present invention refers to systems that merely comprise, preferably contain, dissolved particles and optionally minor amounts of discrete solid particles in the aqueous solvent. It is preferred that the aqueous solution contains dissolved particles in the aqueous solvent. The term "dissolved" in the meaning of the present invention refers to systems in which no discrete solid particles are observed in the solvent. In one embodiment of the present invention, the aqueous solution contains discrete solid particles in the aqueous solvent in an amount of ≤10 wt.-%, more preferably ≤7.5 wt.-%, even more preferably ≤5 wt.-% and most preferable ≤2 wt.-%, based on the total weight of the aqueous solution.

If the at least one carbon dioxide-containing source is provided in form of an aqueous solution, the aqueous solution preferably has a pH of between 5 and 12, more preferably between 6 and 11 and most preferably between 7 and 10.5.

Step c): Providing at Least One Source of at Least One Cation

According to step c) of the present invention, at least one source of at least one cation which is capable of replacing the at least one earth alkali metal cation of the at least one ion exchange material is provided.

The expression "at least one" source of at least one cation means that one or more kinds of sources of at least cation may be utilised in the present method.

According to one embodiment of the present invention, only one kind of source of at least one cation is utilised in the present method. According to another embodiment of the present invention, a mixture of at least two kinds of sources of at least one cation is utilised in the present method.

The expression at least one source of "at least one" cation means that one or more kinds of cation may be provided in the present method.

According to one embodiment of the present invention, only one kind of cation is utilised in the present method. According to another embodiment of the present invention, a mixture of at least two kinds of cation is utilised in the present method.

According to one embodiment of the present invention, the at least one source of at least one cation is one kind of source of a mixture of at least two kinds of cation. Alternatively, the at least one source of at least one cation is one kind of source of one kind of cation.

With respect to the at least one cation, it should be noted that there are no specific restrictions regarding the kind of cation as long as the at least one cation is capable of replacing the at least one earth alkali metal cation of the at least one ion exchange material.

In one embodiment of the present invention, the at least one source of at least one cation comprises at least one monovalent cation. Additionally or alternatively, the at least one source of at least one cation comprises at least one divalent cation.

In one embodiment of the present invention, the at least one cation of the at least one source of at least one cation is preferably selected from the group comprising lithium, sodium, potassium, magnesium, strontium and mixtures thereof.

Accordingly, if the at least one cation of the at least one source of at least one cation is at least one monovalent cation, the at least one monovalent cation is preferably at least one alkali metal cation. If the at least one cation is at least one alkali metal cation, the at least one cation is preferably selected from the group comprising lithium, sodium, potassium and mixtures thereof.

Alternatively or additionally, if the at least one cation of the at least one source of at least one cation is at least one divalent cation, the at least one divalent cation is preferably an earth alkali metal cation differing from the at least one earth alkali metal cation of the at least one ion exchange material of step a) and from the at least one earth alkali metal cation of step d).

For example, if the at least one cation of the at least one source of at least one cation is at least one earth alkali metal cation, the at least one cation is preferably selected from the group comprising magnesium, strontium and mixtures thereof.

In one embodiment of the present invention, the at least one cation of the at least one source of at least one cation is sodium.

It is preferred that the at least one source of at least one cation is an aqueous solution comprising the at least one cation. An "aqueous solution" in the meaning of the present invention refers to systems that merely comprise, preferably contain, dissolved particles and optionally minor amounts of discrete solid particles in the aqueous solvent. It is preferred that the aqueous solution contains dissolved particles in the aqueous solvent. The term "dissolved" in the meaning of the present invention refers to systems in which no discrete solid particles are observed in the solvent. In one embodiment of the present invention, the aqueous solution contains discrete solid particles in the aqueous solvent in an amount of ≤10 wt.-%, more preferably ≤7.5 wt.-%, even more preferably ≤5 wt.-% and most preferable ≤2 wt.-%, based on the total weight of the aqueous solution.

The term "aqueous" solution does not exclude that the aqueous solvent comprises minor amounts of at least one water-miscible solvent.

For example, the at least one water-miscible solvent is preferably selected from methanol, ethanol, acetone, acetonitrile, tetrahydrofuran and mixtures thereof.

In one embodiment of the present invention, the aqueous solution comprises at least one water-miscible solvent in an amount of ≤40 wt.-%, preferably of ≤30 wt.-%, more preferably ≤20 wt.-% and most preferably ≤10 wt.-%, based on the total weight of the solvent phase of the aqueous solution.

In one embodiment of the present invention, the aqueous solution comprising the at least one cation is free of water-miscible solvents.

Additionally or alternatively, if the at least one source of at least one cation is provided in form of an aqueous solution, the aqueous solution comprises at least 50 wt.-%, more preferably at least 75 wt.-% and most preferably at least 90 wt.-%, based on the total weight of the aqueous solution, of water.

For example, the aqueous solution comprises between 90 and 99 wt.-%, more preferably between 91 and 99 wt.-% and most preferably between 92 and 98 wt.-%, based on the total weight of the aqueous solution, of water.

Additionally or alternatively, the at least one source of at least one cation comprises the at least one cation in an amount of from 0.1 to 150 g/l, preferably of from 1 to 100 g/l or of from 5 to 75 g/l. In one embodiment of the present invention, the at least one source of at least one cation comprises the at least one cation in an amount of from 10 to 50 g/l.

If the at least one source of at least one cation is provided in form of an aqueous solution, the aqueous solution preferably has a pH of between 5 and 12, more preferably between 6 and 11 and most preferably between 7 and 10.5.

It is preferred that the at least one source of at least one cation is a naturally occurring source of at least one cation capable of replacing the at least one earth alkali metal cation of the at least one ion exchange material. In one embodiment of the present invention, the at least one source of at least one cation is a naturally occurring source of at least one monovalent and/or divalent cation capable of replacing the at least one earth alkali metal cation of the at least one ion exchange material.

For example, the at least one source of at least one cation is a naturally occurring source of at least one monovalent cation capable of replacing the at least one earth alkali metal cation of the at least one ion exchange material.

For example, the at least one source of at least one cation is a naturally occurring source of at least one monovalent cation such as a subterranean brine which may be a convenient source for divalent cations, monovalent cations or mixtures thereof.

Subterranean brines comprise concentrated aqueous saline compositions. The subterranean brine is preferably obtained from a subterranean site such as just below the Earth's surface such as Earth's oceans or lakes.

In one embodiment of the present invention, the at least one source of at least one cation is sea water. Sea water is often a convenient source of monovalent and/or divalent cations capable of replacing the at least one earth alkali metal cation of the at least one ion exchange material capable of replacing the at least one earth alkali metal cation of the at least one ion exchange material. Any kind of sea water may be used as long as a sufficient amount of the at least one cation is provided. In particular, the amount of the at least one cation in the sea water should not be ≤0.1 g/l, preferably ≤1 g/l, more preferably ≤5 g/l and most preferably ≤10 g/l.

Additionally or alternatively, the at least one source of at least one cation is water having a salinity of between 3 and 35 wt.-%, preferably of between 3 and 20 wt.-%, more preferably of between 3 and 10 wt.-% and most preferably of between 3 and 5 wt.-%, based on the total amount of dissolved salt in the water. For example, the water has a salinity of between 3 and 4.5 wt.-% or of between 3.1 and 4 wt.-%, based on the total amount of dissolved salt in the water.

In one embodiment of the present invention, the at least one source of at least one cation is sea water having a density of at least 1.010 kg/l at 23° C., preferably of at least 1.020 kg/l at 23° C. and most preferably of between 1.020 and 1.030 kg/l at 23° C. For example, the sea water has a density of between 1.020 and 1.025 kg/l at 23° C.

Step d): Providing at Least One Source of at Least One Earth Alkali Metal Cation According to step d) of the present invention, at least one source of at least one earth alkali metal cation is provided.

The expression "at least one" source of at least one earth alkali metal cation means that one or more kinds of sources of at least one earth alkali metal cation may be utilised in the present method.

According to one embodiment of the present invention, only one kind of source of at least one earth alkali metal cation is utilised in the present method. According to another embodiment of the present invention, a mixture of at least two kinds of sources of at least one earth alkali metal cation is utilised in the present method.

The expression at least one source of "at least one" earth alkali metal cation means that one or more kinds of earth alkali metal cation may be provided in the present method.

According to one embodiment of the present invention, only one kind of earth alkali metal cation is utilised in the present method. According to another embodiment of the present invention, a mixture of at least two kinds of earth alkali metal cations is utilised in the present method.

According to one embodiment of the present invention, the at least one source of at least one earth alkali metal cation is one kind of source of a mixture of at least two kinds of earth alkali metal cations. Alternatively, the at least one source of at least one earth alkali metal cation is one kind of source of one kind of earth alkali metal cation.

With respect to the at least one earth alkali metal cation, it should be noted that there are no specific restrictions regarding the kind of earth alkali metal cation as long as the at least one earth alkali metal cation is capable of replacing the at least one cation provided in step c).

Additionally or alternatively, it is preferred that the at least one earth alkali metal cation provided in step d) and the at least one earth alkali metal cation of the ion exchange material of step a) are of the same kind.

Additionally or alternatively, the at least one earth alkali metal cation is selected from the group comprising magnesium, calcium, strontium and mixtures thereof.

In one embodiment of the present invention, the at least one earth alkali metal cation comprises calcium and/or magnesium. For example, the at least one earth alkali metal cation comprises calcium.

If the at least one earth alkali metal cation comprises calcium and/or magnesium, the presence of further earth alkali metal cations in the at least one source of at least one earth alkali metal cation is not excluded. For example, if the at least one source of at least one earth alkali metal cation comprises calcium, the at least one source of at least one earth alkali metal cation may further comprise magnesium and/or strontium. In one embodiment of the present invention, the at least one source of at least one earth alkali metal cation comprises calcium and magnesium.

In one embodiment of the present invention, the at least one earth alkali metal cation provided in step d) and the at least one cation of the at least one source of at least one cation provided in step c) are different. For example, if the at least one earth alkali metal cation of step d) comprises calcium, the at least one cation of step c) comprises lithium, sodium, potassium, magnesium, strontium and mixtures thereof. If the at least one earth alkali metal cation of step d) comprises magnesium, the at least one cation of step c) comprises lithium, sodium, potassium, calcium, strontium and mixtures thereof. If the at least one earth alkali metal cation of step d) comprises strontium, the at least one cation of step c) comprises lithium, sodium, potassium, magnesium, calcium and mixtures thereof.

Alternatively, if the at least one earth alkali metal cation of step d) comprises calcium and magnesium, the at least one cation of step c) comprises lithium, sodium, potassium, strontium and mixtures thereof. If the at least one earth alkali metal cation of step d) comprises calcium and strontium, the at least one cation of step c) comprises lithium, sodium, potassium, magnesium and mixtures thereof. If the at least one earth alkali metal cation of step d) comprises magnesium and strontium, the at least one cation of step c) comprises lithium, sodium, potassium, calcium and mixtures thereof.

It is further appreciated that the at least one cation of step c) comprises lithium, sodium, potassium and mixtures thereof if the at least one earth alkali metal cation of step d) comprises calcium, magnesium and strontium.

It is preferred that the at least one source of at least one earth alkali metal cation is an aqueous solution comprising the at least one earth alkali metal cation.

An "aqueous solution" in the meaning of the present invention refers to systems that merely comprise, preferably contain, dissolved particles and optionally minor amounts of discrete solid particles in the aqueous solvent. It is preferred that the aqueous solution contains dissolved particles in the aqueous solvent. The term "dissolved" in the meaning of the present invention refers to systems in which no discrete solid particles are observed in the solvent. In one embodiment of the present invention, the aqueous solution contains discrete solid particles in the aqueous solvent in an amount of ≤10 wt.-%, more preferably ≤7.5 wt.-%, even more preferably ≤5 wt.-% and most preferable ≤2 wt.-%, based on the total weight of the aqueous solution. The term "aqueous" solution does not exclude that the aqueous solvent comprises minor amounts of at least one water-miscible solvent.

For example, the at least one water-miscible solvent is preferably selected from methanol, ethanol, acetone, acetonitrile, tetrahydrofuran and mixtures thereof.

In one embodiment of the present invention, the aqueous solution comprises at least one water-miscible solvent in an amount of ≤40 wt.-%, preferably of ≤30 wt.-%, more preferably ≤20 wt.-% and most preferably ≤10 wt.-%, based on the total weight of the solvent phase of the aqueous solution.

In one embodiment of the present invention, the aqueous solution comprising the at least one earth alkali metal cation is free of water-miscible solvents.

Additionally or alternatively, if the at least one source of at least one earth alkali metal cation is provided in form of an aqueous solution, the aqueous solution comprises at least 50 wt.-%, more preferably at least 75 wt.-% and most preferably at least 90 wt.-%, based on the total weight of the aqueous solution, of water.

For example, the aqueous solution comprises between 90 and 99 wt.-%, more preferably between 91 and 99 wt.-% and most preferably between 92 and 98 wt.-%, based on the total weight of the aqueous solution, of water.

Additionally or alternatively, the at least one source of at least one earth alkali metal cation comprises the at least one earth alkali metal cation in an amount from 0.1 to 200 mg/l, preferably from 0.5 to 150 mg/l, more preferably from 1 to 100 mg/l, even more preferably from 5 to 75 mg/l and most preferably from 10 to 50 mg/l.

If the at least one source of at least one earth alkali metal cation is provided in form of an aqueous solution, the aqueous solution preferably has a pH of between 5 and 12, more preferably between 6 and 11 and most preferably between 7 and 10.5.

It is preferred that the at least one source of at least one earth alkali metal cation is a naturally occurring source of at least one earth alkali metal cation. In one embodiment of the present invention, the at least one source of at least one earth alkali metal cation is a naturally occurring source of at least one earth alkali metal cation which is capable of replacing the at least one cation provided in step c).

For example, the at least one source of at least one earth alkali metal cation is a naturally occurring source of calcium.

In one embodiment of the present invention, the at least one source of at least one earth alkali metal cation is a naturally occurring source of at least one earth alkali metal cation such as fresh hard water.

Any kind of fresh hard water may be used as long as a sufficient amount of the at least one earth alkali metal cation, preferably calcium, is provided. In particular, the amount of the at least one earth alkali metal cation, preferably calcium, in the fresh hard water should not be ≤0.1 g/l, preferably ≤0.5 g/l, more preferably ≤1 g/l, even more preferably ≤5 g/l and most preferably ≤10 g/l.

Additionally or alternatively, the fresh hard water is selected such that it has a hardness of from 5 to 130° dH, preferably from 10 to 60° dH, and most preferably from 14 to 50° dH.

For the purpose of the present invention the hardness refers to the German hardness and is expressed in "degree German hardness, ° dH". In this regard, the hardness refers to the total amount of earth alkali metal cations in the aqueous solution comprising the earth alkali hydrogen carbonate, and it is measured by complexometric titration at pH 10 using ethylene-diamine-tetra-acetic acid (EDTA) and Eriochrome T as equivalent point indicator.

The fresh hard water may be selected from any naturally occurring source such as lakes and/or rivers and/or inland seas.

Additionally or alternatively, the hard fresh water may be anthropogenic. For example, a fresh soft water may be contacted with at least one earth alkali metal cation in order to prepare fresh hard water that is suitable for the inventive method. In one embodiment of the present invention, divalent cations such as calcium and/or magnesium are added to fresh soft water. It is further appreciated that the fresh hard water may be obtained from a water remineralization process. Processes for water remineralization are described in e.g. U.S. Pat. No. 7,374,694, EP 0 520826, WO 2010/12691, European Patent Application 11 175 012.1, European Patent Application 10 172 771.7 and European Patent Application 11 179 541.5.

Step e): Contacting the at Least One Ion Exchange Material with the at Least One Source of at Least One Cation According to step e) of the present invention, the at least one ion exchange material of step a) is contacted with the at least one source of at least one cation of step c).

The contacting provides a mixture comprising i) at least one ion exchange material, and ii) at least one earth alkali metal cation released from the at least one ion exchange material of step a).

The contacting of the at least one ion exchange material of step a) with the at least one source of at least one cation can be accomplished by any conventional means known to the skilled person. Preferably, the contacting may be carried out under mixing conditions. The skilled person will adapt the mixing conditions such as the mixing speed and temperature according to his process equipment.

In particular, it is appreciated that the contacting of method step e) may be accomplished by any kind of tank and/or vessel well known to the man skilled in the art for combining and/or mixing and/or stirring suspensions comprising a particulate material such as an ion exchange material. For example, the contacting step e) may be carried out in a vertical and/or horizontal mixing unit, preferably a vertical mixing unit.

Preferably, the mixing unit used for contacting step e) comprises stirring means. For example, the stirring means are selected from mechanical stirring means such as a stirring blade typically used for agitating and mixing suspensions comprising a particulate material in a tank and/or vessel. Alternatively, the stirring means are selected from powder-liquid mixing means typically used for agitating and mixing more concentrated suspensions comprising a particulate material in a tank and/or vessel.

Additionally or alternatively, the contacting of the at least one ion exchange material of step a) with the at least one source of at least one cation can be accomplished by injecting the at least one source of at least one cation in form of an aqueous solution into an aqueous suspension or emulsion comprising the at least one ion exchange material. If the at least one ion exchange material of step a) is provided in form of a solid or a filter material or a fluidized bed, the contacting of the at least one ion exchange material of step a) with the at least one source of at least one cation can be accomplished by adding the at least one source of at least one cation in form of an aqueous solution. In this regard, it should be noted that the mixing conditions may be accomplished by the flow of the at least one source of at least one cation introduced into the at least one ion exchange material.

In one embodiment of the present invention, contacting step e) is carried out at a temperature from 2° C. to 80° C., preferably from 4° C. to 60° C. and most preferably from 5° C. to 40° C.

For example, contacting step e) may be carried out at room temperature, i.e. at 20° C. or at other temperatures.

According to one embodiment of the present invention, method step e) is carried out for at least 1 s, preferably for at least 1 min, e.g. for at least 15 min, 30 min, 1 hour, 2 hours, 4 hours, 6 hours, 8 hours, or 10 hours.

In one embodiment of the present invention, the mixture obtained in contacting step e) is in form of an aqueous suspension. If an aqueous suspension is obtained, contacting step e) is preferably carried out at a pH of between 5 and 12, more preferably between 6 and 11 and most preferably between 7 and 10.5.

The mixture obtained in contacting step e) comprises i) at least one ion exchange material and ii) at least one earth alkali metal cation released from the at least one ion exchange material. In particular, it should be noted that at least a part of the at least one earth alkali metal cation that is bound to the at least one ion exchange material of step a) is exchanged with the at least one cation of step c) during contacting step e).

The at least one earth alkali metal cation of step ii) and the at least one ion exchange material of step i) are separated in separation step f).

Step f): Separating the at Least One Earth Alkali Metal Cation from the at Least One Ion Exchange Material According to step f) of the present invention, the at least one earth alkali metal cation of step ii) is separated from the at least one ion exchange material of step i).

In one embodiment of the present invention, separation step f) is carried out at a temperature from 2° C. to 80° C., preferably from 4° C. to 60° C. and most preferably from 5° C. to 40° C. For example, separation step f) is carried out at room temperature, i.e. at 20° C. or at other temperatures.

In one embodiment of the present invention, separation step f) is carried out at a pH of between 5 and 12, more preferably between 6 and 11 and most preferably between 7 and 10.5.

The separation of the at least one earth alkali metal cation of step ii) from the at least one ion exchange material of step i) can be accomplished by any conventional separation means known to the skilled person. For example, the separation of the at least one earth alkali metal cation of step ii) from the at least one ion exchange material of step i) is accomplished by filtration, centrifugation, cycloning, sedimentation or a mixture thereof.

If the mixture obtained in contacting step e) is in form of an aqueous suspension, the at least one earth alkali metal cation of step ii) is separated from the at least one ion exchange material of step i) preferably by filtration, e.g. by a membrane filtration unit, to separate the at least one earth alkali metal cation of step ii) from the at least one ion exchange material of step i).

The at least one membrane filtration unit used for separating the at least one earth alkali metal cation of step ii) from the at least one ion exchange material of step i) may be any kind of membrane filter known to the skilled person and typically used for filtering aqueous suspensions/solutions comprising a particulate material. For example, a cross flow membrane microfiltration device and/or a cross flow membrane ultrafiltration device may be used.

It is appreciated that there is a pressure difference between the inside of the membrane filtering unit and the surrounding environment so that suspended particulate ion exchange material is separated from the suspension/solution and a clear aqueous solution comprising the at least one earth alkali metal cation of step ii) is obtained. Preferably, the pressure inside the membrane filtering unit is higher than the pressure of the surrounding environment.

An "aqueous solution" in the meaning of the present invention refers to systems that merely comprise, preferably contain, dissolved particles and optionally minor amounts of discrete solid particles in the aqueous solvent. It is preferred that the aqueous solution contains dissolved particles in the aqueous solvent. The term "dissolved" in the meaning of the present invention refers to systems in which no discrete solid particles are observed in the solvent. In one embodiment of the present invention, the aqueous solution contains discrete solid particles in the aqueous solvent in an amount of $\leq 10$ wt.-%, more preferably $\leq 7.5$ wt.-%, even more preferably $\leq 5$ wt.-% and most preferable $\leq 2$ wt.-%, based on the total weight of the aqueous solution.

For example, the at least one membrane filtration unit used for separating the at least one earth alkali metal cation of step ii) from the at least one ion exchange material of step i) is a cross flow membrane filtration device. Additionally or alternatively, the at least one membrane filtration unit used for separating the at least one earth alkali metal cation of step ii) from the at least one ion exchange material of step i) is a cross flow membrane ultrafiltration device.

Cross flow membrane filtration devices are known to the skilled man. One cross flow membrane filtration device that may be suitable for the inventive method includes the cross flow membrane filtration device available from Microdyn-Nadir GMBH, Germany as Mycrodyn Modul CMB 150.

In one embodiment of the invention, the aqueous solution comprising the at least one earth alkali metal cation of step ii) obtained after separating the at least one earth alkali metal cation of step ii) from the at least one ion exchange material of step i) has a hardness from 5 to 130° dH, preferably from 10 to 60° dH, and most preferably from 14 to 50° dH.

Additionally or alternatively, the aqueous solution comprising the at least one earth alkali metal cation of step ii) obtained after separating the at least one earth alkali metal cation of step ii) from the at least one ion exchange material of step i) has a pH of between 4 and 12, preferably between 5 and 11 and most preferably between 7 and 10.5.

In one embodiment of the present invention, the aqueous solution comprising the at least one earth alkali metal cation of step ii) obtained after separating the at least one earth alkali metal cation of step ii) from the at least one ion exchange material of step i) has a concentration of the at least one earth alkali metal cation of at least 1 mg/l, preferably of at least 100 mg/l, more preferably of at least 1 000 mg/l, even more preferably of at least 2 500 mg/l and most preferably of at least 5 000 mg/l. For example, the aqueous solution comprising the at least one earth alkali metal cation of step ii) obtained after separating the at least one earth alkali metal cation of step ii) from the at least one ion exchange material of step i) has a concentration of the at least one earth alkali metal cation of at least 7 500 mg/l or of at least 10 000 mg/l.

Additionally or alternatively, the aqueous solution comprising the at least one earth alkali metal cation of step ii) obtained after separating the at least one earth alkali metal cation of step ii) from the at least one ion exchange material of step i) has a concentration of the at least one earth alkali metal cation from 1 to 30 000 mg/l, preferably from 100 to 25 000 mg/l, more preferably from 1 000 to 20 000 mg/l, even more preferably from 2 500 to 15 000 mg/l and most preferably from 5 000 to 12 500 mg/l.

In one embodiment of the present invention, the aqueous solution comprising the at least one earth alkali metal cation of step ii) obtained after separating the at least one earth alkali metal cation of step ii) from the at least one ion exchange material of step i) has a turbidity value of lower than 1.0 NTU, preferably of lower than 0.5 NTU, and most preferably of lower than 0.3 NTU.

The at least one earth alkali metal cation obtained after separating the at least one earth alkali metal cation of step ii) from the at least one ion exchange material of step i) is further contacted with the at least one carbon dioxide-containing source of step b) in method step g). The at least one ion exchange material obtained after separating the at least one earth alkali metal cation of step ii) from the at least one ion exchange material of step i) is further contacted with the at least one source of at least one earth alkali metal cation of step d) in method step h).

Step g): Contacting the at Least One Earth Alkali Metal Cation with the at Least One Carbon Dioxide-Containing Source According to step g) of the present invention, the at least one earth alkali metal cation obtained in step f) is contacted with the at least one carbon dioxide-containing source of step b). The contacting provides a carbonate salt of the at least one earth alkali metal cation.

The contacting of the at least one earth alkali metal cation with the at least one carbon dioxide-containing source can be accomplished by any conventional means known to the skilled person. Preferably, the contacting may be carried out under mixing conditions. The skilled person will adapt the mixing conditions such as the mixing speed and temperature according to his process equipment.

In one embodiment of the present invention, the at least one earth alkali metal cation obtained in step f) is in form of an aqueous solution.

If an aqueous solution is provided, it is appreciated that the contacting of method step g) may be accomplished by any kind of tank and/or vessel well known to the man skilled in the art for combining and/or mixing and/or stirring aqueous solutions. For example, contacting step g) may be carried out in a vertical and/or horizontal mixing unit, preferably a vertical mixing unit.

Preferably, the mixing unit used for contacting step g) comprises stirring means. For example, the stirring means are selected from mechanical stirring means such as a stirring blade typically used for agitating and mixing suspensions comprising a particulate material in a tank and/or vessel. Alternatively, the stirring means are selected from powder-liquid mixing means typically used for agitating and mixing more concentrated suspensions comprising a particulate material in a tank and/or vessel.

In one embodiment of the present invention, the carbon dioxide-containing source, preferably gaseous carbon dioxide, is introduced, preferable injected, into the aqueous solution comprising the at least one earth alkali metal cation obtained in step f), forming a dispersion of carbon dioxide bubbles in the solution and allowing the bubbles to dissolve therein.

According to one embodiment of the present invention, contacting step g) is carried out under pressure of at least 100 Pa, more preferably at least 200 Pa and most preferably at least 300 Pa.

For example, the carbon dioxide is introduced under pressure into the aqueous solution comprising the at least one earth alkali metal cation obtained in step f).

In one embodiment of the present invention, contacting step g) is carried out at a temperature from 2° C. to 80° C., preferably from 4° C. to 60° C. and most preferably from 5° C. to 40° C. For example, contacting step g) may be carried out at room temperature, i.e. at 20° C. or at other temperatures.

According to one embodiment of the present invention, method step g) is carried out for at least 1 s, preferably for at least 1 min, e.g. for at least 15 min, 30 min, 1 hour, 2 hours, 4 hours, 6 hours, 8 hours, or 10 hours.

Additionally or alternatively, contacting step g) is preferably carried out at a pH of between 5 and 12, more preferably between 6 and 11 and most preferably between 7 and 10.5. In one embodiment of the present invention, contacting step g) is carried out at a pH of between 8 and 10.5 or between 8.2 and 10.5.

According to one embodiment of the present invention, the aqueous solution obtained in step f) is further contacted with at least one catalyst for enhancing the hydratisation of carbon dioxide. For example, the at least one catalyst for enhancing the hydratisation of carbon dioxide is at least one enzyme. In one embodiment of the present invention, the at least one catalyst for enhancing the hydratisation of carbon dioxide is carbonic anhydrase.

According to method step g), a carbonate salt of the at least one earth alkali metal cation is obtained by the contacting of the at least one earth alkali metal cation with the at least one carbon dioxide-containing source.

In one embodiment of the present invention, the obtained carbonate salt of the at least one earth alkali metal cation is a water insoluble carbonate salt of the at least one earth alkali metal cation. For example, the obtained carbonate salt of the at least one earth alkali metal cation has a solubility in water at 25° C. of ≤1 000 mg/l, preferably of ≤500 mg/l, more preferably of ≤200 mg/l and most preferably of ≤150 mg/l. For example, the obtained carbonate salt of the at least one earth alkali metal cation has a solubility in water at 25° C. of ≤100 mg/l or of ≤50 mg/l. In one embodiment of the present invention, the obtained carbonate salt of the at least one earth alkali metal cation has a solubility in water at 25° C. of ≤30 mg/l or of ≤20 mg/l.

In one embodiment of the present invention, the obtained carbonate salt of the at least one earth alkali metal cation is calcium carbonate.

In one embodiment of the present invention, the method further comprises step k) of separating the carbonate salt of the at least one earth alkali metal cation obtained in step g).

The separation of the carbonate salt of the at least one earth alkali metal cation obtained in step g) according to step k) can be accomplished by any conventional separation means known to the skilled person. For example, the separation of the carbonate salt of the at least one earth alkali metal cation obtained in step g) is accomplished by filtration, centrifugation, cycloning, concentrating, evaporation, sedimentation or a mixture thereof.

If the carbonate salt of the at least one earth alkali metal cation obtained in step g) is in form of an aqueous suspension, the carbonate salt of the at least one earth alkali metal cation is preferably separated by filtration, e.g., by a membrane filtration unit, from the aqueous phase.

The at least one membrane filtration unit used for separating the carbonate salt obtained in step g) according to step k) may be any kind of membrane filter known to the skilled person and typically used for filtering aqueous suspensions/solutions comprising a particulate material. For example, a cross flow membrane microfiltration device and/or a cross flow membrane ultrafiltration device may be used.

In one embodiment of the present invention, the at least one membrane filtration unit used for separating the carbonate salt obtained in step g) is a cross flow membrane filtration device and/or a cross flow membrane ultrafiltration device as further defined above.

In one embodiment of the invention, the aqueous solution obtained after separating the carbonate salt obtained in step g) has a hardness from 1 to 100° dH, preferably from 2 to 50° dH, and most preferably from 3 to 25° dH.

Additionally or alternatively, the aqueous solution obtained after separating the carbonate salt obtained in step g) has a pH of between 4 and 12, preferably between 5 and 11 and most preferably between 7 and 10.5. In one embodiment of the present invention, the aqueous solution obtained after separating the carbonate salt obtained in step g) has a pH of between 8 and 10.5 or between 8.2 and 10.5.

Additionally or alternatively, the aqueous solution obtained after separating the carbonate salt obtained in step g) has a concentration of the at least one earth alkali metal cation of ≤10 mg/l, preferably of ≤5 mg/l, more preferably of ≤1 mg/l and most preferably of ≤0.5 mg/l.

In one embodiment of the present invention, the aqueous solution obtained after separating the carbonate salt obtained in step g) has a turbidity value of lower than 1.0 NTU, preferably of lower than 0.5 NTU, and most preferably of lower than 0.3 NTU.

The carbonate salt of the at least one earth alkali metal cation separated in step k) is preferably obtained as a precipitate in the filter. The obtained carbonate salt may be dried with any suitable method known in the art. The carbonate salt of the at least one earth alkali metal cation may be dried, for example, thermally, e.g. by means of a spray drier or a microwave or in an oven, or mechanically, e.g. by lowering the water content.

Step h): Contacting the at Least One Ion Exchange Material with the at Least One Source of at Least One Earth Alkali Metal Cation According to step h) of the present invention, the at least one ion exchange material obtained in step f) is contacted with the at least one source of at least one earth alkali metal cation of step d). The contacting regenerates the at least one ion exchange material of step a).

The contacting of the at least one ion exchange material with the at least one source of at least one earth alkali metal cation can be accomplished by any conventional means known to the skilled person. Preferably, the contacting may be carried out under mixing conditions. The skilled person will adapt the mixing conditions such as the mixing speed and temperature according to his process equipment.

In one embodiment of the present invention, the at least one ion exchange material obtained in step f) is in form of an aqueous suspension.

If an aqueous suspension is provided, it is appreciated that the contacting of method step h) may be accomplished by any kind of tank and/or vessel well known to the man skilled in the art for combining and/or mixing and/or stirring aqueous suspensions. For example, contacting step h) may be carried out in a vertical and/or horizontal mixing unit, preferably a vertical mixing unit.

Preferably, the mixing unit used for contacting step h) comprises stirring means. For example, the stirring means are selected from mechanical stirring means such as a stirring blade typically used for agitating and mixing suspensions comprising a particulate material in a tank and/or vessel. Alternatively, the stirring means are selected from powder-liquid mixing means typically used for agitating and mixing more concentrated suspensions comprising a particulate material in a tank and/or vessel.

Additionally or alternatively, contacting step h) may be carried out in that the at least one ion exchange material obtained in step f) is provided in form of filter material or a fluidized bed to which the at least one source of at least one earth alkali metal cation of step d) is added in order to regenerate the at least one ion exchange material of step a).

It is appreciated that contacting step g) and contacting step h) are made independently from each other. Accordingly, the contacting the at least one ion exchange material obtained in step f) with the at least one source of at least one earth alkali metal cation of step d) according to method step h) is carried out before and/or during and/or after contacting step g).

If the ion exchange material obtained in step f) and/or the at least one source of at least one earth alkali metal cation of step d) are in the form of an aqueous solution or aqueous suspension, contacting step h) may be carried out at any temperature—optionally applying a pressure-, at which the aqueous solutions or aqueous suspensions remain in a liquid state.

Accordingly, contacting step h) is carried out at a temperature from −10° C. to +80° C., preferably from −2° C. to 70° C., more preferably from 4° C. to 60° C. and most preferably from 5° C. to 40° C. For example, contacting step h) may be carried out at room temperature, i.e. at 20° C. or at other temperatures.

According to one embodiment of the present invention, contacting step h) is carried out for at least 1 s, preferably for at least 1 min, e.g. for at least 15 min, 30 min, 1 hour, 2 hours, 4 hours, 6 hours, 8 hours, or 10 hours.

Additionally or alternatively, contacting step h) is preferably carried out at a pH of between 5 and 12, more preferably between 6 and 11 and most preferably between 7 and 10.5. In one embodiment of the present invention, contacting step h) is preferably carried out at a pH of between 8 and 10.5 or between 8.2 and 10.5.

According to method step h), the at least one ion exchange material is regenerated by contacting the at least one ion exchange material obtained in step f) with the at least one source of at least one earth alkali metal cation of step d).

Accordingly, it is appreciated that the at least one earth alkali metal cation of the at least one ion exchange material of step a) and the at least one earth alkali metal cation of the at least one source of step d) are the same. In one embodiment of the present invention, the at least one earth alkali metal cation of the at least one ion exchange material of step a) and the at least one earth alkali metal cation of the at least one source of step d) are calcium.

In one embodiment of the present invention, the at least one ion exchange material regenerated in contacting step h) is reused as the at least one ion exchange material of step a).

If an aqueous suspension is obtained after contacting the at least one ion exchange material with the at least one source of at least one earth alkali metal cation, the regenerated at least one ion exchange material may be separated from the aqueous phase. Such separation can be accomplished by any conventional separation means known to the skilled person as defined in step f) above.

The regenerated at least one ion exchange material obtained according to method step h) as described above may be concentrated and/or dried with any suitable method known in the art. The regenerated at least one ion exchange material may be concentrated and/or dried, for example, thermally, e.g. by means of a spray drier or a microwave or in an oven, or mechanically, e.g. by filtration, or lowering the water content.

Accordingly, the foregoing method according to the present invention leads to a stable earth alkali metal carbonate product, i.e. can be easily isolated and avoids the use of cost-intensive raw materials based on manmade resources. Furthermore, the method utilizes a regeneratable ion exchange material such that the sorbent material is not consumed.

In view of the very good results obtained, the present invention refers in another aspect to the use of the regeneratable ion exchange material for reducing the amount of $CO_2$ from a carbon dioxide-containing source. In one embodiment of the present invention, the regeneratable ion exchange material comprises bentonite.

The scope and interest of the invention will be better understood based on the following examples which are intended to illustrate certain embodiments of the invention and are non-limitative.

FIGURES

FIG. 1 refers to the concentration of free calcium ions in dependence of bentonite content in deionised water and a 3.5 wt. % NaCl solution. The third curve relates to the difference in the concentration of free calcium ions released at a given bentonite concentration between deionized water and 3.5 wt.-% NaCl solution.

Figure 2:
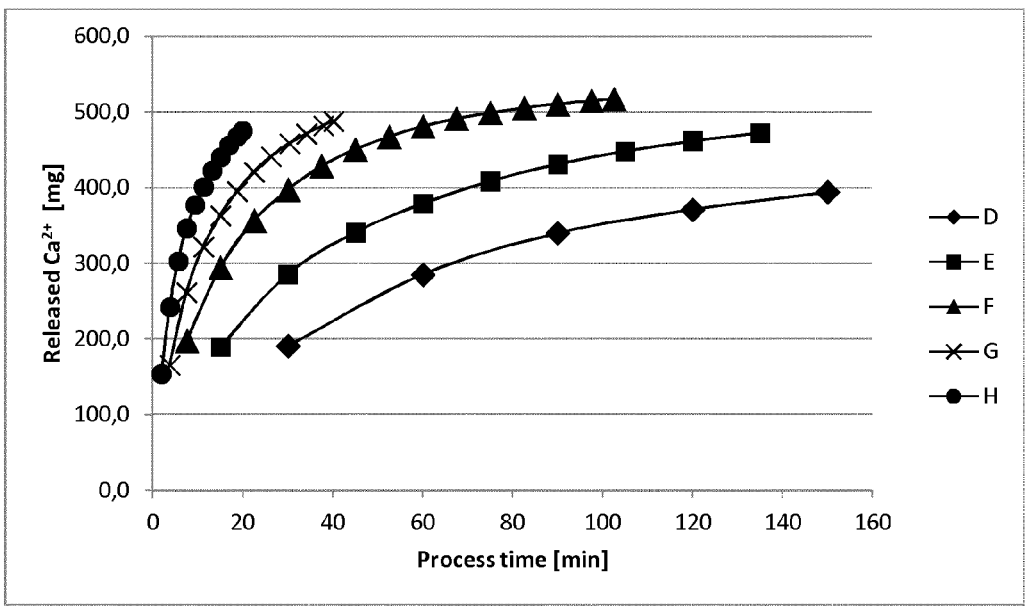

FIG. 2 refers to the amount of released calcium ions in function of the process time of several trials (D, E, F, G, H) that were carried out by flushing the ion exchanger with NaCl solutions of different feed rates, while the NaCl concentration of the solutions was the same for each trial.

Figure 3:
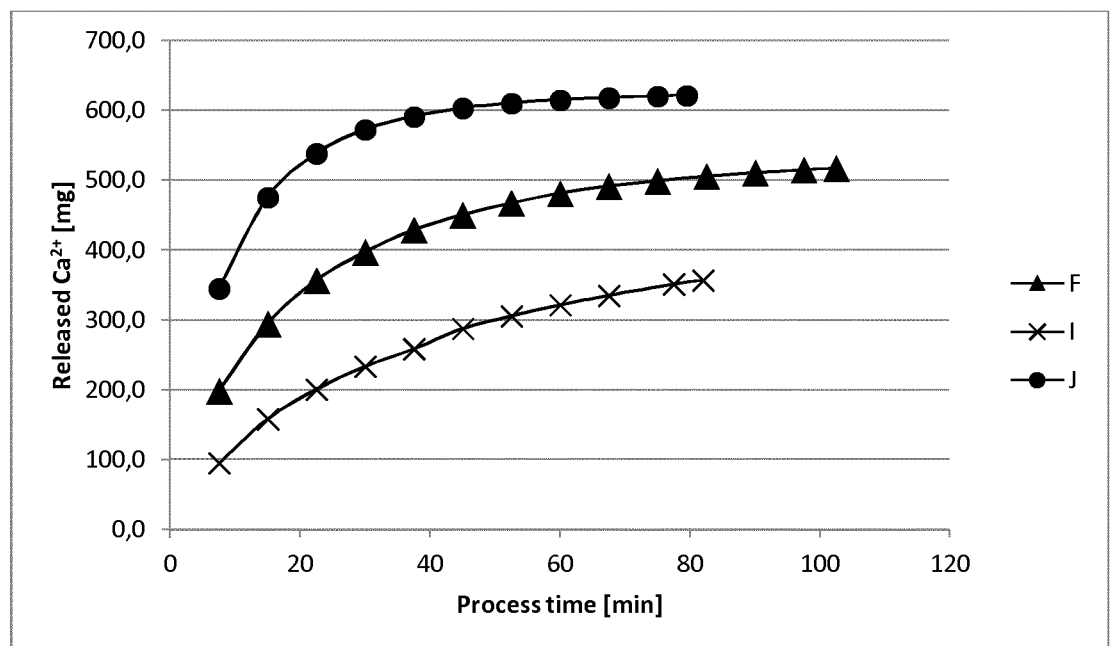

FIG. 3 refers to the amount of released calcium ions in function of the process time of several trials (F, I, J) that were carried out by flushing the ion exchanger with NaCl solutions of different concentrations, while the feed rate was the same for each trial (4 ml/min).

EXAMPLES

1. Measurement Methods pH Measurement

The pH is measured at 25° C. using a Mettler Toledo Seven Easy pH meter and a Mettler Toledo InLab® Expert Pro pH electrode. A three point calibration (according to the segment method) of the instrument is first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 seconds).

Brookfield Viscosity

The Brookfield viscosity was measured after 1 minute of stirring by the use of a RVT model Brookfield™ viscometer at a temperature of 25° C., and a rotation speed of 100 rpm (revolutions per minute) with the appropriate disc spindle from N° 1 to 5.

Particle Size Distribution (Mass % Particles with a Diameter <X) and Weight Median Grain Diameter ($d_{50}$) of Particulate Material Weight median grain diameter and grain diameter mass distribution of a particulate material were determined via the sedimentation method, i.e. an analysis of sedimentation behaviour in a gravimetric field. The measurement was made with a Mastersizer 2000 from Malvern Instruments GmbH, Germany. Alternatively, the measurement was made with a Sedigraph 5120 device from Micromeritics, USA.

The method and the instrument are known to the skilled person and are commonly used to determine grain size of fillers and pigments. The samples were dispersed using a high speed stirrer and ultrasonic.

The $d_{98}$ value indicates a diameter value such that 98% by weight of the particles have a diameter of less than this value.

X-Ray Fluorescence Spectroscopy

The XRF data were obtained by using methods and instruments known to the skilled person and are commonly used to determine the composition of samples.

Weight Solids (Wt. %) of a Material in Suspension

The weight solids were determined by dividing the weight of the solid material by the total weight of the aqueous suspension. The weight solids content was determined at 160° C. using a Moisture Analyser MJ 33, Mettler Toledo.

Turbidity

The turbidity was measured with a Hach Lange 2100AN IS Laboratory Turbidimeter and the calibration was performed using StabCal turbidity standards (formazine standards) of <0.1, 20, 200, 1 000, 4 000 and 7 500 NTU.

Determination of the Hardness (German Hardness; Expressed in "° dH")

The hardness refers to the total amount of earth alkali ions in the aqueous solution comprising the earth alkali hydrogen carbonate, and it is measured by complexometric titration using ethylene-diamine-tetra-acetic acid (EDTA; trade name Titriplex III) and Eriochrome T as equivalent point indicator.

EDTA (chelating agent) forms with the ions $Ca^{2+}$ and $Mg^{2+}$ soluble, stable chelate complexes. 2 ml of a 25% ammonia solution, an ammonia/ammonium acetate buffer (pH 10) and Eriochrome black T indicator were added to 100 ml of a water sample to be tested. The indicator and the buffer is usually available as so-called "indicator-buffer tablet". The indicator, when masked with a yellow dye, forms a red colored complex with the $Ca^{2+}$ and $Mg^{2+}$ ions. At the end of the titration, that is when all ions are bound by the chelating agent, the remaining Eriochrome black T indicator is in its free form which shows a green colour. When the indicator is not masked, then the colour changes from magenta to blue. The total hardness can be calculated from the amount of EDTA that has been used.

The table 1 below shows a conversion for the different units of the water hardness.

TABLE 1

Conversion for the different units of the water hardness[1]

|  |  | °dH | °e | °fH | ppm[2] | mval/l | mmol/l |
|---|---|---|---|---|---|---|---|
| German Hardness | 1° dH = | 1 | 1.253 | 1.78 | 17.8 | 0.357 | 0.1783 |
| English Hardness | 1° e = | 0.798 | 1 | 1.43 | 14.3 | 0.285 | 0.142 |
| French Hardness | 1° fH = | 0.560 | 0.702 | 1 | 10 | 0.2 | 0.1 |
| ppm $CaCO_3$ (USA) | 1 ppm = | 0.056 | 0.07 | 0.1 | 1 | 0.02 | 0.01 |
| mval/l Earth alkali ions | 1 mval/l = | 2.8 | 3.51 | 5 | 50 | 1 | 0.50 |
| mmol/l Earth alkali ions | 1 mmol/l = | 5.6 | 7.02 | 10.00 | 100.0 | 2.00 | 1 |

[1]Data as obtained from http://de.wikipedia.org/wiki/Wasserh%C3%A4rte
[2]In this regard the unit ppm is used in the meaning of 1 mg/l $CaCO_3$.

Determination of the Ion Concentration

The ion concentration is determined by measuring the build-up of electrical field strength by a selective adsorption of calcium ions on a resin membrane.

The measurement of ion concentration is carried out at 25° C. using Mettler Toledo Seven Multi instrumentation equipped with the corresponding Mettler Toledo perfectION electrode during stirring of the suspension/solution by using a magnetic stirrer and the corresponding stirring plate.

The ion concentration measurement was started directly following stirring the bentonite containing suspensions/solutions at 1 500 rpm using a Pendraulik tooth disc stirrer.

The instrument is first calibrated in the relevant ion concentration range using commercially available calibration solutions having concentrations of 1 mmol/l, 10 mmol/l and 100 mmol/l, respectively, from Fluka, Switzerland.

The reported ion concentration values are the values detected by the instrument after 1 minute after electrode immersion into the suspension/solution to be measured.

To samples of tab water or samples derived from an ion exchange process involving a commercially available ion exchanger, an ion strength adjuster (available from Mettler Toldeo Switzerland, ISA-Lösung, 51344761) was added in an amount of 1 ml to a 50 ml sample.

XRD

The X-ray diffraction (XRD) pattern of the Ca bentonite was performed according to the following method:

The mineralogical phases present in the Ca bentonite are determined by means of X-ray diffraction (XRD) using a Bruker D8 Advance diffractometer, according to the diffraction powder method. This diffractometer consists of a 2.2 kW X-ray tube, a 9-position sample holder, a Theta-Theta (θ-θ) goniometer, and a VÅNTEC-1 detector. Ni-filtered Cu Kα radiation is employed in all experiments. The profiles are chart recorded automatically using a 0.01° 2θ increment and a 1 s/step scan speed from 20 to 50° 2θ. The resulting powder diffraction patterns are classified by mineral content using the International Center for Diffraction Data (ICDD) powder diffraction file (PDF) database 2 and are summarized in the following Table 2.

TABLE 2

| Mineral name | Formula | Content in the bentonite powder |
|---|---|---|
| Calcite | $CaCO_3$ | 9.7 |
| Gypsum | $CaSO_4 \cdot 2H_2O$ | 2.3 |
| Montmorillonite | $(Na,Ca)_{0.3}(Al,Mg)_2Si_4O_{10}(OH)_2 \cdot nH_2O$ | 53.2 |
| Anorthite | $CaAl_2Si_2O_8$ | 13.7 |

TABLE 2-continued

| Mineral name | Formula | Content in the bentonite powder |
|---|---|---|
| Quartz | $SiO_2$ | 3.7 |
| Muscovite/Illite | $KAl_2[(OH,F)_2|AlSi_3O_{10}]$ | 17.4 |
| Total sum |  | 100.0 |

2. Examples

The bentonite used was a Ca bentonite from Milos, Greece, and had the following characteristics:

A weight median grain diameter $d_{50}$ of 12.86 μm, and a $d_{98}$ of 86 μm.

Example 1

This example refers to the preparation of a stable carbonate salt by using bentonite as ion exchange material.

3.5 wt.-% NaCl was added to a 0.1 M NaOH solution. To this solution, bentonite was added such that the obtained slurry has an amount of bentonite of about 5 wt.-%, based on the total weight of the suspension. This suspension was stirred for 10 minutes by using a small stirrer with a mounted propeller. Subsequently, the suspension was vacuum filtrated and then $CO_2$ (commercially available from Pangas, Switzerland as Kohlendioxid UN 1013) was bubbled into the filtrate. The white precipitate was centrifuged and washed with deionised water two times before drying.

The precipitate was characterised by XRF as being 98 wt.-% $CaCO_3$, based on the total weight of the precipitate.

Example 2

This example refers to the capability of bentonite to be activated and then regenerated in one cycle.

3.5 wt.-% NaCl was added to a 0.1 M NaOH solution. To this solution, bentonite was added such that the obtained slurry has an amount of bentonite of about 10 wt.-%, based on the total weight of the suspension. This suspension was stirred for 10 minutes by using a small stirrer with a mounted propeller. Subsequently, the suspension was vacuum filtrated and then $CO_2$ (commercially available from Pangas, Switzerland as Kohlendioxid UN 1013) was bubbled into the filtrate. The white precipitate was centrifuged and washed with deionised water two times before drying. The precipitate of this first sequestration was not analyzed.

Subsequently, the filter cake (the activated bentonite), was added to a 1 wt.-% $CaCl_2$ (commercially available from Merck, Germany as calcium chloride anhydrous) solution, based on the total weight of the solution, such that the obtained suspension has an amount of bentonite of about 10 wt.-%, based on the total weight of the suspension. The obtained suspension was stirred for 10 minutes and then vacuum filtrated. The filter cake was washed with deionised water and vacuum filtrated until there was no precipitation in the filtrate when $NaHCO_3$ was added.

This filter cake was used again for an experiment described in Example 1. The precipitate was characterized by XRF as being 96 wt.-% $CaCO_3$, based on the total weight of the precipitate.

Example 3

This example refers to the preparation of a stable carbonate salt by using bentonite as ion exchange material at a pH of about 8.

A 0.1 M NaOH solution was added to 3.5 wt.-% NaCl solution, based on the total weight of the solution, such that the solution has a pH of about 8. To this solution, bentonite was added such that the obtained slurry has an amount of bentonite of about 10 wt.-%, based on the total weight of the suspension. This suspension was stirred for 10 minutes by using a small stirrer with a mounted propeller. Subsequently, the suspension was vacuum filtrated and then $CO_2$ (commercially available from Pangas, Switzerland as Kohlendioxid UN 1013) was bubbled into the filtrate. Furthermore, 0.1 M NaOH solution was added such as to keep the pH at above 8.2. The white precipitate was centrifuged and washed with deionised water two times before drying.

The precipitate was characterised by XRF as being 96 wt.-% $CaCO_3$, based on the total weight of the precipitate.

Example 4

This Example refers to the capability of bentonite for releasing calcium cations in the presence of sodium cations.

A reference experiment was carried out in which bentonite was added portion wise to deionised water and the calcium-ion concentration was measured after a given time after bentonite addition (about three minutes).

The same experiment was carried out using a 3.5 wt.-% NaCl solution, based on the total weight of the solution, with a starting pH of 10 (adjusted with 1M NaOH) instead of deionised water.

It can be gathered from FIG. 1 that the addition of bentonite to deionised water already releases certain calcium ions (curve named $H_2O$ deionized). This is to be expected due to an "osmotic" driving force. Furthermore one can see that the presence of sodium cations clearly enhances the release of calcium ions (curve named 3.5 wt.-% NaCl solution).

A calcium ion sensitive electrode was used and calcium ion concentration measurements were started around three minutes after the addition of bentonite.

Example 5

This Example refers to the capability of a commercial ion exchanger resin for releasing calcium cations in the presence of sodium cations.

7 equal samples of the ion exchanger were prepared as follows:

For each sample, 10 g of a commercially available ion exchange material (DOWEX™ MARATHON™ C from The Dow® Chemical Company) were placed in a plastic hose (internal diameter=8 mm, length=250 mm). In order to keep the ion exchange material within the plastic hose two metal meshes were placed in the plastic hose in such a way that the ion exchange material was trapped in between the two meshes.

Each sample of the ion exchanger was then flushed with 5 000 ml of hard tab water (° dH~20) at a constant rate of 150 ml/min before starting each trial to ensure that the ion exchanger was in its calcium ion loaded state (effluent water ° dH~20).

Then, each sample of the calcium ion loaded ion exchanger was flushed with a different NaCl solution of different concentration and at a different flow rate as outlined in the following Table 3.

TABLE 3

| Trial | NaCl concentration (wt.-%) | Flow rate (ml/min) |
|---|---|---|
| D | 3.5 | 1 |
| E | 3.5 | 2 |
| F | 3.5 | 4 |
| G | 3.5 | 8 |
| H | 3.5 | 16 |
| I | 7 | 4 |
| J | 1.75 | 4 |

Samples of 30 ml were taken consecutively of the solution exiting each sample of the ion exchanger and the calcium ion concentration was measured using the calcium ion specific electrode.

FIG. 2 shows the amount of released calcium ions in function of the process time for a NaCl concentration of 3.5 wt.-% at different NaCl solution feed rates. It can be seen that there is a substantial release of calcium ions from the ion exchanger due to the feed of NaCl solution to the ion exchanger. Furthermore, it can be seen that an increased NaCl solution feed rate leads to a faster release of the calcium ions from the ion exchanger.

FIG. 3 shows the amount of released calcium ions in function of the process time for the same feed rates (4 ml/min) but using different NaCl concentrations of the solution. Therefrom, it can be derived that an increased NaCl concentration of the feed solution enhances the release of calcium ions from the ion exchanger. However, it can also be seen that a NaCl concentration of 3.5 wt.-% (corresponding to approximately the NaCl concentration of sea water) is already high enough to give a reasonably high calcium ion concentration. For example the 6 600 ppm* of calcium ions that are released in trial F in the first sample (FIG. 3).

Finally, it can be gathered from this Example that using the inventive process allows a) to get significantly higher calcium concentrations compared to the ones present in hard water (cf. 6 600 ppm* calcium of trial (F) compared to typical hard water in the Oftringen area, Aargau, Switzerland, of around 160 ppm calcium) that enhances a later precipitation process and b) to reuse the ion exchanger material as all the experiments were carried out using the same ion exchanger material.

*The calcium concentration in ppm can be calculated from the data in FIG. 2 and FIG. 3 as follows:

$$Ca^{2+} conc(ppm) = (Released\ Ca^{2+} \times 1000)/V_{sample}$$

wherein:
$Ca^{2+}$ conc (ppm): calcium ion concentration of the sample in ppm
Released $Ca^{2+}$: The mass of released calcium ions in the sample in mg
$V_{sample}$: Volume of the sample in ml (in this Experiment the sample is always 29 ml).

The invention claimed is:

1. A method for reducing the amount of $CO_2$ in a carbon dioxide-containing source by using a regeneratable ion exchange material, comprising the following steps of:
   a) providing at least one ion exchange material comprising at least one earth alkali metal cation,
   b) providing at least one carbon dioxide-containing source,
   c) providing at least one source of at least one cation which is capable of replacing the at least one earth alkali metal cation of the at least one ion exchange material,
   d) providing at least one source of at least one earth alkali metal cation,
   e) contacting the at least one ion exchange material of step a) with the at least one source of at least one cation of step c) such as to obtain a mixture comprising
      i) at least one ion exchange material, and
      ii) at least one earth alkali metal cation released from the at least one ion exchange material of step a),
   f) separating the at least one earth alkali metal cation of step ii) from the at least one ion exchange material of step i),
   g) contacting the at least one earth alkali metal cation obtained in step f) with the at least one carbon dioxide-containing source of step b) such as to obtain a carbonate salt of the at least one earth alkali metal cation, and
   h) contacting the at least one ion exchange material obtained in step f) with the at least one source of at least one earth alkali metal cation of step d) such as to regenerate the at least one ion exchange material of step a).

2. The method of claim 1, wherein the at least one ion exchange material of step a) is selected from the group consisting of a natural ion exchange material, a modified ion exchange material, a synthetic ion exchange material, and any mixture thereof.

3. The method of claim 1, wherein the at least one ion exchange material of step a) comprises a natural ion exchange material selected from the group consisting of phyllosilicates, zeolite, mica, montmorillonite, mauritzite, and any mixture thereof, and/or a synthetic ion exchange material selected from the group consisting of eDTA, ion exchange resins, and any mixture thereof.

4. The method of claim 1, wherein the at least one ion exchange material of step a) comprises a phyllosilicate.

5. The method of claim 1, wherein the at least one ion exchange material of step a) comprises at least one earth alkali metal cation selected from the group consisting of magnesium, calcium, strontium, and any mixture thereof.

6. The method of claim 1, wherein the at least one ion exchange material of step a) comprises calcium and/or magnesium as an earth alkali metal cation.

7. The method of claim 1, wherein the at least one ion exchange material of step a) is provided in form of a solid or an aqueous suspension or an emulsion or a filter material or a fluidized bed.

8. The method of claim 1, wherein the at least one ion exchange material of step a) is provided in form of an aqueous suspension having an ion exchange material content of from 2 to 50 wt.-%, based on the total weight of the aqueous suspension.

9. The method of claim 1, wherein the at least one ion exchange material of step a) is provided in form of an aqueous suspension having an ion exchange material content of from 5 to 30 wt.-%, based on the total weight of the aqueous suspension.

10. The method of claim 1, wherein the at least one ion exchange material of step a) consists of bentonite comprising clay minerals selected from the group consisting of montmorillonites, concomitant minerals, quartz, mica, kaolinite, feldspar, pyrite, calcite, cristobalite, and any mixture thereof.

11. The method of claim 1, wherein the at least one ion exchange material of step a) consists of bentonite having a montmorillonite content of at least 60 wt.-%, based on the total weight of the bentonite.

12. The method of claim 1, wherein the at least one ion exchange material of step a) consists of bentonite having a montmorillonite content of at least 80 wt.-%, based on the total weight of the bentonite.

13. The method of claim 1, wherein the ion exchange material of step a) consists of bentonite whose interlayer spaces are occupied primarily with calcium and/or magnesium ions.

14. The method of claim 1, wherein the at least one ion exchange material of step a) consists of bentonite having a weight median particle size $d_{50}$ from 0.02 to 100 μm.

15. The method of claim 1, wherein the at least one ion exchange material of step a) consists of bentonite having a weight median particle size $d_{50}$ from 0.075 to 50 μm.

16. The method of claim 1, wherein the at least one ion exchange material of step a) consists of bentonite having a weight median particle size $d_{50}$ from 0.1 to 5 μm.

17. The method of claim 1, wherein the at least one carbon dioxide-containing source of step b) is selected from a gas, liquid, solid, complex, ion exchange material, and any mixture thereof.

18. The method of claim 1, wherein the at least one carbon dioxide-containing source of step b) is a gas.

19. The method of claim 1, wherein the at least one carbon dioxide-containing source of step b) is selected from air, industrial exhaust gas streams, waste gas streams, volcanic outgassing, and any mixture thereof.

20. The method of claim 1, wherein the at least one carbon dioxide-containing source of step b) comprises carbon dioxide providing a partial pressure of at least 0.02 Pa.

21. The method of claim 1, wherein the at least one source of at least one cation of step c) and/or the at least one source of at least one earth alkali metal cation of step d) is an aqueous solution comprising at least 50 wt.-%, based on the total weight of the aqueous solution, of water.

22. The method of claim 1, wherein the at least one source of at least one cation of step c) is a naturally occurring source of at least one monovalent and/or divalent cation capable of replacing the at least one earth alkali metal cation of the at least one ion exchange material.

23. The method of claim 1, wherein the at least one source of at least one cation of step c) is sea water.

24. The method of claim 1, wherein the at least one carbon dioxide-containing source of step b) and/or the at least one source of at least one cation which is capable of replacing the at least one earth alkali metal cation of the at least one ion exchange material of step c) and/or the at least one source of at least one earth alkali metal cation are provided in form of an aqueous solution having a pH of between 5 and 12.

25. The method of claim 1, wherein the at least one cation of the at least one source of at least one cation of step c) is selected from the group comprising lithium, sodium, potassium, magnesium, strontium, and any mixture thereof.

26. The method of claim 1, wherein the at least one cation of the at least one source of at least one cation of step c) is sodium.

27. The method of claim 1, wherein the at least one source of at least one cation of step c) comprises the at least one cation in an amount of from 0.1 to 150 g/l.

28. The method of claim 1, wherein the at least one source of at least one earth alkali metal cation of step d) is a naturally occurring source of at least one earth alkali metal cation.

29. The method of claim 1, wherein the at least one source of at least one earth alkali metal cation of step d) is fresh hard water having a hardness of from 5 to 130° dH.

30. The method of claim 1, wherein the at least one earth alkali metal cation of the at least one source of at least one earth alkali metal cation of step d) is selected from magnesium, calcium, strontium, and any mixture thereof.

31. The method of claim 1, wherein the at least one earth alkali metal cation of the at least one source of at least one earth alkali metal cation of step d) is calcium.

32. The method of claim 1, wherein the at least one source of at least one earth alkali metal cation of step d) comprises the at least one earth alkali metal cation in an amount from 0.1 to 200 mg/l.

33. The method of claim 1, wherein contacting step g) is carried out in that the at least one carbon dioxide-containing source of step b) is introduced into an aqueous solution obtained in step f).

34. The method according to claim 33, wherein the aqueous solution obtained in step f) is further contacted with at least one catalyst for enhancing the hydratisation of carbon dioxide.

35. The method according to claim 34, wherein the at least one catalyst for enhancing the hydratisation of carbon dioxide is at least one enzyme.

36. The method according to claim 35, wherein the at least one enzyme is carbonic anhydrase.

37. The method of claim 1, wherein contacting step e) and/or separating step f) and/or contacting step g) and/or contacting step h) is/are carried out at a temperature from 2° C. to 80° C.

38. The method of claim 1, wherein contacting step e) and/or separating step f) and/or contacting step g) and/or contacting step h) is/are carried out at a pH of between 4 and 12.

39. The method of claim 1, wherein contacting step g) is carried out under pressure of at least 100 Pa.

40. The method of claim 1, wherein contacting step h) is carried out before and/or during and/or after contacting step g).

41. The method of claim 1, wherein separating step f) is carried out by filtration, centrifugation, cycloning, sedimentation, or any mixture thereof.

42. The method of claim 1, which further comprises step k) of separating the carbonate salt of the at least one earth alkali metal cation obtained in step g).

43. The method of claim 42, wherein separating step k) is carried out by filtration, centrifugation, cycloning, concentrating, evaporation, sedimentation, or any mixture thereof.

* * * * *